US008796602B2

(12) United States Patent
Miyauchi et al.

(10) Patent No.: US 8,796,602 B2
(45) Date of Patent: Aug. 5, 2014

(54) INDUCTION HEATING APPARATUS

(75) Inventors: Takahiro Miyauchi, Hyogo (JP); Izuo Hirota, Hyogo (JP)

(73) Assignee: Panasonic Corporation, Osaka (JP)

( * ) Notice: Subject to any disclaimer, the term of this patent is extended or adjusted under 35 U.S.C. 154(b) by 1505 days.

(21) Appl. No.: 12/161,430

(22) PCT Filed: Feb. 1, 2007

(86) PCT No.: PCT/JP2007/051704
§ 371 (c)(1),
(2), (4) Date: Jul. 18, 2008

(87) PCT Pub. No.: WO2007/088931
PCT Pub. Date: Aug. 9, 2007

(65) Prior Publication Data

US 2010/0230401 A1 Sep. 16, 2010

(30) Foreign Application Priority Data

Feb. 2, 2006 (JP) ................................ 2006-025460

(51) Int. Cl.
*H05B 6/08* (2006.01)
*G03G 15/20* (2006.01)
*H02M 5/45* (2006.01)

(52) U.S. Cl.
USPC ........... 219/665; 219/660; 219/626; 219/674; 219/667; 219/620; 399/67; 399/69; 399/88; 399/328; 399/331; 363/37; 363/67; 363/80; 363/97

(58) Field of Classification Search
CPC ..... H05B 6/062; H02P 27/047; H02M 5/4585
USPC ......... 219/661–665, 660, 626, 619, 674, 667, 219/620; 399/67, 69, 88, 328, 331–334; 363/37, 67, 80, 97
See application file for complete search history.

(56) References Cited

U.S. PATENT DOCUMENTS 3,718,852 A * 2/1973 Bailey ............................ 363/80
4,352,000 A * 9/1982 Fujishima et al. ............ 219/626

(Continued)

FOREIGN PATENT DOCUMENTS

JP 05-251172 9/1993
JP 6-189562 7/1994

(Continued)

OTHER PUBLICATIONS

JP_2004319160_A.pdf machine translation.*

(Continued)

*Primary Examiner* — Dana Ross
*Assistant Examiner* — Ket D Dang
(74) *Attorney, Agent, or Firm* — RatnerPrestia

(57) ABSTRACT

An induction heating device includes the following elements: a resonance circuit; a power factor improvement circuit for boosting rectified output, supplying the output to an inverter, and improving the power factor of a commercial alternating current; and a load material detector for detecting the material of the load. The inverter includes switching elements forming a full-bridge circuit. The drive frequency of the switching elements is switched between a frequency substantially equal to a resonance frequency of the resonance circuit and a frequency substantially 1/n time (n being an integer equal to or larger than two) thereof, according to a detection result of the load material.

16 Claims, 7 Drawing Sheets

(56) References Cited

U.S. PATENT DOCUMENTS

| | | | | |
|---|---|---|---|---|
| 4,471,196 | A * | 9/1984 | Frank et al. | 219/665 |
| 4,820,891 | A * | 4/1989 | Tanaka et al. | 219/626 |
| 6,043,470 | A * | 3/2000 | Dahl | 219/661 |
| 6,275,397 | B1 * | 8/2001 | McClain | 363/89 |
| 6,462,966 | B1 * | 10/2002 | Leung et al. | 363/25 |

FOREIGN PATENT DOCUMENTS

| | | | | |
|---|---|---|---|---|
| JP | 2816621 | | 8/1998 | |
| JP | 3460997 | | 8/2003 | |
| JP | 2003-257609 | A | 9/2003 | |
| JP | 2004-319160 | A | 11/2004 | |
| JP | 2004319160 | A * | 11/2004 | H05B 6/12 |
| JP | 2005-116385 | A | 4/2005 | |
| JP | 2005-149915 | A | 6/2005 | |
| JP | 2005-293941 | A | 10/2005 | |
| JP | 2006-351371 | A | 12/2006 | |

OTHER PUBLICATIONS

JP_2004319160A_human_trans.pdf.*
International Search Report for International Application No. PCT/JP2007/051704 dated May 15, 2007.
Supplementary European Search Report for Application No. EP 07 70 7890, Oct. 13, 2009, Panasonic Corporation.

* cited by examiner

INDUCTION HEATING APPARATUS

This Application is a U.S. National Phase Application of PCT International Application PCT/JP2007/051704.

TECHNICAL FIELD

The present invention relates to an induction heating device. The examples of the induction heating device include an induction heating cooker capable of performing efficient induction heating on an object to be heated that has a high conductivity and a low magnetic permeability, such as an aluminum pan, and an induction-heating water heater, humidifier, and iron.

BACKGROUND ART

Hereinafter, as an example of a conventional induction heating device, a description is provided of an induction heating cooker in which a heating coil generates a high-frequency magnetic field and eddy current produced by electromagnetic induction heats a load, such as a pan, with reference to FIG. 6.

FIG. 6 is a diagram showing the circuit structure of a conventional induction heating cooker disclosed in Patent Document 1. Power source 51 is a 200V commercial power supply, i.e. a low-frequency AC power supply, connected to the input end of rectifier circuit 52, i.e. a bridge diode. Between the output ends of rectifier circuit 52, first smoothing capacitor 53 is connected. Between the output ends of rectifier circuit 52, a serially connected body of choke coil 54 and second switching element 57 is also connected. Heating coil 59 is faced to aluminum pan 61, i.e. an object to be heated.

As shown in FIG. 6, the part surrounded by the dotted line is inverter 50. The terminal on the low potential side of second smoothing capacitor 62 is connected to the negative terminal of rectifier circuit 52. The terminal on the high potential side of second smoothing capacitor 62 is connected to the terminal on the high potential side (collector) of first switching element (insulated gate bipolar transistor, hereinafter referred to as an IGBT) 55. The terminal on the low potential side of first switching element (IGBT) 55 is connected to the junction point between choke coil 54 and the terminal on the high potential side (collector) of second switching element (IGBT) 57. A serially connected body of heating coil 59 and resonant capacitor 60 is connected in parallel with second switching element 57.

First diode 56 (a first reverse conducting element) is connected in anti-parallel with first switching element 55. Second diode 58 (a second reverse conducting element) is connected in anti-parallel with second switching element 57.

Snubber capacitor 64 is connected in parallel with second switching element 57. A serially connected body of correction resonant capacitor 65 and relay 66 is connected in parallel with resonant capacitor 60. Fed into control circuit 63 are a detection signal from current transformer 67 for detecting the input current from power supply 51 and a detection signal from current transformer 68 for detecting the current through heating coil 59. Control circuit 63 also supplies signals to the gates of first switching element 55 and second switching element 57 and to the drive coil (not shown) of relay 66.

A description is provided of the operation of the conventional induction heating cooker structured as above. Power supply 51 is full-wave rectified by rectifier circuit 52 and the rectified power is supplied to first smoothing capacitor 53 connected between the output ends of rectifier circuit 52. First smoothing capacitor 53 works as a supply source for supplying high-frequency current to inverter 50.

FIGS. 7A and 7B are diagrams showing the waveforms in the respective parts of the circuit of the conventional induction heating device. FIG. 7A shows the waveforms at a high output of 2 kW. Waveform A1 shows a waveform of current Ic1 flowing through first switching element 55 and first diode 56. Waveform B1 shows a waveform of current Ic2 flowing through second switching element 57 and second diode 58. Waveform C1 shows voltage Vce2 generated between the collector and the emitter of second switching element 57. Waveform D1 shows drive voltage Vg1 applied to the gate of first switching element 55. Waveform E1 shows drive voltage Vg2 applied to the gate of second switching element 57. Waveform F1 shows current $I_L$ flowing through heating coil 59.

As shown in FIG. 7A, at an output of 2 kW, control circuit 63 outputs an ON signal having a drive period of $T_2$ (approximately 24 μs) to the gate of second switching element 57 from time t0 to time t1, as shown by waveform E1. During this drive period $T_2$, resonance occurs in a closed circuit formed of second switching element 57, second diode 58, heating coil 59, and resonant capacitor 60. The number of turns (40T) of heating coil 59 and the capacitance (0.04 μF) of resonant capacitor 60 are set so that the resonance cycle when pan 61 is made of aluminum is approximately ⅔ time of drive period $T_2$ (approximately 16 μs). When the resonance frequency is set as f, the resonance cycle is 1/f, which is shown in FIG. 7A. Choke coil 54 stores the electrostatic energy of smoothing capacitor 53, as magnetic energy, in drive period $T_2$ of second switching element 57.

Next, at time t1, i.e. the timing between the second peak of the resonance current through second switching element 57 and the time when the resonance current is set at zero next, at which the collector current is flowing in the forward direction of second switching element 57, the driving of second switching element 57 is stopped.

This operation turns off second switching element 57, thus rising the electric potential of the terminal of choke coil 54 connected to the collector of second switching element 57. When this electric potential exceeds the electric potential of second smoothing capacitor 62, second smoothing capacitor 62 is charged through first diode 56, and the magnetic energy stored in choke coil 54 is released. The voltage of second smoothing capacitor 62 is increased to 500V so as to be higher than the peak value (283V) of DC output voltage Vdc of rectifier 52. The boosting level depends on the conduction period of second switching element 57. The longer conduction period tends to generate a higher voltage in second smoothing capacitor 62.

In this manner, when resonance occurs in a closed circuit formed of second smoothing capacitor 62, first switching element 55 or first diode 56, heating coil 59, and resonant capacitor 60, the voltage level of second smoothing capacitor 62 working as a DC power supply is increased. This operation changes the cusp value (peak value) of the resonance current flowing through first switching element 55 shown by waveform A1 in FIG. 7A and the resonance route so that the cusp value of the resonance current flowing through second switching element 57 in which successive resonance is to occur is not zero or a small value as shown in waveform B1. Thus, high-output induction heating is performed on an aluminum pan, and the output can continuously be changed and controlled.

Then, as shown by waveform D1 and waveform E1 of FIG. 7A, control circuit 63 outputs a drive signal to the gate of first switching element 55, at time t2 after a pause provided after time t1 to prevent simultaneous conduction of first switching element 55 and second switching element 57. As a result, as shown in waveform A1, resonance current flows through a closed circuit formed of heating coil 59, resonant capacitor 60, first switching element 55 or first diode 56, and second smoothing capacitor 62, in a different route. Drive period $T_1$ of this drive signal is set to a period substantially equal to $T_2$. Thus, similar to conduction of second switching element 58, a resonance current having a cycle approximately ⅔ of drive period $T_2$ flows.

Therefore, current $I_L$ as shown by waveform F1 of FIG. 7A flows through heating coil 59. The drive cycle of the first and second switching elements (the sum of $T_1$, $T_2$, and the pause) is approximately three times of the cycle of the resonance current. When the drive frequency of the first and second switching elements is approximately 20 kHz, the frequency of the resonance current flowing through heating coil 56 is approximately 60 kHz.

FIG. 7B shows the waveforms at a low output of 450 W. Although the details are omitted, the drive cycle is set shorter than the drive cycle at an output of 2 kW.

At activation, control circuit 63 turns off relay 66, and alternately drives first switching element 55 and second switching element 57 at a fixed frequency (approximately 21 kHz). At this time, the switching elements are driven in a mode in which the drive period of first switching element 55 is shorter than the resonance cycle of the resonance current. In other words, the drive-time ratio is minimized to provide the minimum output setting, and then gradually increased. During this time, control circuit 63 detects the material of load pan 61 based on the detection output from current transformer 67 and the detection output from current transformer 68.

When control circuit 63 determines that the material of load pan 61 is iron-based, the control circuit stops heating, turns on relay 66, and restarts heating at a low output. At this time, control circuit 63 drives first switching element 55 and second switching element 57 at a fixed frequency (approximately 21 kHz) at the minimum drive-time ratio again. The output is at the minimum at the beginning and is gradually increased to a predetermined value.

On the other hand, when control circuit 63 detects that the material of load pan 61 is not iron-based and a predetermined drive-time ratio is reached, the mode is changed so that the cycle of the resonance current is shorter than the drive period of first switching element 57, as shown in FIG. 7B. At this time, the drive period is set to provide a low output.

As described above, when a load having a high conductivity and a low magnetic permeability, such as aluminum and copper, is heated by a magnetic field generated by heating coil 59, the resonance current through first switching element 55 and second switching element 57 caused by heating coil 59 and resonant capacitor 60 has a cycle ($2T_1/3$) shorter than the drive period ($T_1$) of each switching element. As a result, current at a frequency of three times of the drive frequency of first switching element 55 and second switching element 57 can be supplied to heating coil 59 for heating. Further, choke coil 54, i.e. a booster, and second smoothing capacitor 62, i.e. a smoothing part, are provided to increase and smooth the voltage of smoothing capacitor 62, i.e. a high-frequency power supply, and increase the amplitude of resonance current in each drive period. Thus, even when, after the start of driving, the first cycle of the resonance current is completed, the second cycle is reached and thereafter, the resonance current having a sufficiently large amplitude can be continued.

In the conventional induction heating cooker structured as above, load detection for determining whether the load is made of a material having a high conductivity and a low magnetic permeability, such as aluminum, or an iron-based material is accurately made at a low output. Thus, turning on/off the relay can switch the resonant capacitor and thus allows induction heating in which large heating output can efficiently be obtained according to the material of the load.

Further, Patent Document 2 discloses a method in which switching between a full-bridge circuit system and a half-bridge circuit system according to whether the load is a magnetic pan or a non-magnetic pan eliminates the need of a switching relay for both of the magnetic pan and the non-magnetic pan.

However, in the conventional structure of changing the capacitance of the resonant capacitor according to the material of the load as shown in Patent Document 1, a complicated structure, including a relay having a high withstand voltage for switching the resonant capacitor, is necessary for heating both of a load material having a high conductivity and a low magnetic permeability, such as aluminum, and a load of an iron-based material. Further, unless the capacitance of the resonant capacitor is set appropriately for heating aluminum or the like and switched, the following problem arises. Particularly in heating an iron-based load having a low conductivity, small capacitance of the resonant capacitor increases the drive frequency of the switching elements and the voltage to be applied to the switching elements. This phenomenon increases the loss of the switching elements and makes it difficult to provide sufficient output.

In the conventional structure shown in Patent Document 2, when the device is set appropriately for heating a material having a low conductivity, such as an iron-based material, and attempts to obtain high output in heating a material having a high conductivity and a low magnetic permeability, such as aluminum, the small equivalent resistance of the resonance circuit including the load is assumed to considerably increase the rated current of the inverter. Inversely, when the resonance circuit is set appropriately for heating a material having a high conductivity and a low magnetic permeability, such as aluminum, the maximum output power (hereinafter referred to as maximum heating output) of the resonance circuit is decreased, and the targeted heating output cannot be obtained with a material having a low conductivity. Thus, it is difficult to heat materials at a practical level, ranging from a material having a high conductivity and a low magnetic permeability, such as aluminum and copper, to a material having a low conductivity, such as a magnetic material.

[Patent Document 1] Japanese Patent No. 3460997
[Patent Document 2] Japanese Patent No. 2816621

SUMMARY OF THE INVENTION

An induction heating device includes the following elements:

a resonance circuit including:

a heating coil magnetically coupling a load and having substantially a fixed number of turns; and a resonant capacitor having substantially a fixed capacitance;

an inverter that includes switching elements forming a full-bridge circuit, and supplies electric power to the resonance circuit;

a heating output controller for driving the switching elements and controlling heating output of the heating coil;

a rectifier for rectifying a commercial alternating current;

a power factor improvement part for boosting the rectified output from the rectifier, supplying the output voltage to the inverter, and improving the power factor of the commercial alternating current; and a load material detector for detecting a material of the load.

The heating output controller switches the drive frequency of the switching elements between a frequency substantially equal to a frequency of the resonance frequency of the resonance circuit and a frequency substantially 1/n time (n being an integer equal to or larger than two) thereof, according to a load material detection result of the load material detector. The power factor improvement part is controlled to be capable of changing the magnitude of the output voltage.

These operations can provide high heating output with a simplified structure irrespective of the materials to be heated ranging from a material having a high conductivity, such as aluminum and cupper, to a material having a low conductivity, such as a magnetic material, while reducing the load imposed on the switching elements.

REFERENCE MARKS IN THE DRAWINGS

Figure 1:
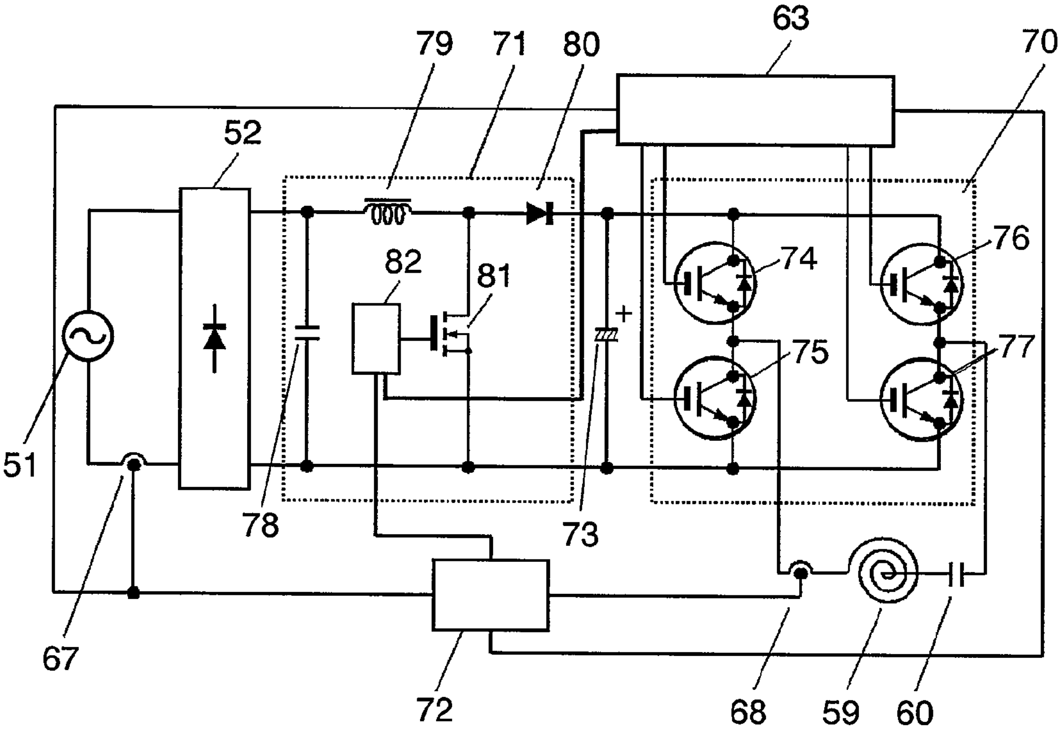
FIG. 1 is a circuit structure diagram of an induction heating device in accordance with a first exemplary embodiment of the present invention.

52 Rectifier
59 Heating coil
60 Resonant capacitor
63 Heating output control circuit (heating output controller)
67, 68 Current transformer
70 Inverter
74 Power factor improvement circuit (power factor improvement part)
72 Load material detector
74 First switching element
75 Second switching element
76 Third switching element
77 Fourth switching element

DETAILED DESCRIPTION OF PREFERRED EMBODIMENT

Hereinafter, a description is provided of an exemplary embodiment of the present invention, with reference to the accompanying drawings.

First Exemplary Embodiment

FIG. 1 is a circuit structure diagram of an induction heating cooker, i.e. an induction heating device, in accordance with the first exemplary embodiment of the present invention. As shown in FIG. 1, a 200V commercial power supply is applied to the induction heating device, as power supply 51. The induction heating device includes rectifier 52 made of a diode bridge, and power factor improvement circuit (power factor improvement part) 71 surrounded by the dotted line and made of first smoothing capacitor 78, choke coil 79, diode 80, MOS-FET 81, and power factor improvement controller 82. The current of the commercial power supply is converted to boosted direct current by rectifier 52 and power factor improvement circuit (power factor improvement part) 71. The output voltage is changeable according to the output signal from load material detector 72 or heating output control circuit 63. Then, control is made so that the power factor of the commercial power supply is in proximity to one while electricity is stored in second smoothing capacitor 73. The boosted direct current is converted to high-frequency current by inverter 70, and supplied to a resonance circuit that includes heating coil 59 having substantially a fixed number of turns and resonant capacitor 60 having substantially a fixed capacitance. The high-frequency current flowing through heating coil 59 generates a high-frequency magnetic field. A pan (not shown), i.e. a load, is disposed so that the bottom face thereof is faced to heating coil 59. Heating coil 59 is magnetically coupled to the load when the heating coil generates the high-frequency magnetic field. Resonant capacitor 60 and heating coil 59 form a serial resonance circuit. The resonance frequency of this resonance circuit is set at approximately 90 kHz.

In inverter 70, a serial circuit of first switching element 74 and second switching element 75 and a serial circuit of third switching element 76 and fourth switching element 77 are connected between both ends of second smoothing capacitor 81 to form a full-bridge circuit having the resonance circuit as output. The resonance circuit is formed between the junction point of first switching element 74 and second switching element 75 and the junction point of third switching element 76 and fourth switching element 77. Each of switching elements 74, 75, 76, and 77 is made of an insulated gate bipolar transistor (IGBT) and a diode connected in anti-parallel with the IGBT. Then, heating output control circuit (heating output controller) 63 alternately drives a set of first switching element 74 and fourth switching element 77 and a set of second switching element 75 and third switching element 76. When the output is to be increased, the switching elements are driven by heating output control circuit 63 so that the drive frequency of the switching elements approaches the resonance frequency. A heating output detector including current transformer 67 detects the heating output of heating coil 59. Upon reception of the detection result, heating output control circuit 63 changes the drive frequency of the switching elements so that predetermined heating output is ensured. Inverter 70 of the frequency control type is thus structured. Further provided is load material detector 72 that receives and compares the detection output of current transformer 67, and the detection output of a resonance current detector including current transformer 68, and detects the material of a pan, i.e. a load.

Figure 2:
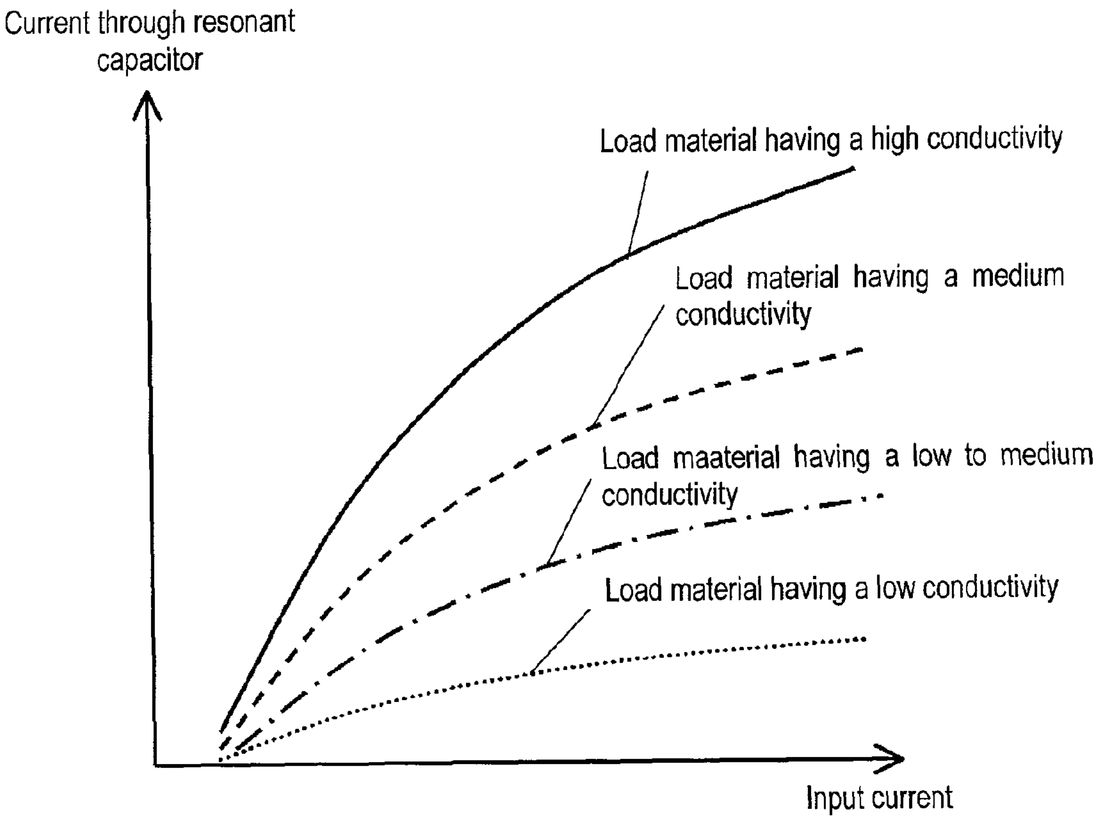
FIG. 2 is a graph showing characteristics of detection input of a load material detector in the induction heating device in accordance with the first exemplary embodiment of the present invention.

Next, a description is provided of the operation of the induction heating device thus structured. First, a description is provided of how load material detector 72 of the induction heating device detects the material of a pan, i.e. a load, at activation. FIG. 2 is a graph showing characteristics of detection input of load material detector 72 in the induction heating device in accordance with the first exemplary embodiment of the present invention. The abscissa axis shows input current of the induction heating device detected by current transformer 67. The ordinate axis shows resonance current flowing through resonant capacitor 60 and detected by current transformer 68. At activation, heating output control circuit 63 alternately drives a set of first switching element 74 and fourth switching element 77 and a set of second switching element 75 and third switching element 76, at a fixed frequency (approximately 60 kHz). The drive period of first switching element 74 and fourth switching element 77 is set shorter than the resonance cycle of the resonance current. The drive-time ratio, i.e. the drive-time ratio between a set of first switching element 74 and fourth switching element 77 and a set of second switching element 75 and third switching element 76, is minimized to provide the minimum heating output, and gradually increased. During this period, load material detector 72 compares the detection output of current transformer 67 for detecting the input current as a heating output detector with the detection output of current transformer 68 for detecting the resonance current flowing through resonant capacitor 60 as a resonance current detector, determines the ratio of the output of current transformer 68 with respect to the output of current transformer 67, and detects the material of the load.

As shown in FIG. 2, the materials of pans to be used for cooking are typically classified into the four types, according to the relation between the magnitude of the input current of the induction heating device and the magnitude of the resonance current flowing through resonant capacitor 60. The four types are as follows: a magnetic material having a low conductivity, such as an iron pan and a magnetic stainless steel pan; a material having a low to medium conductivity, such as a non-magnetic stainless steel thin plate (0.5 mm thick, for example), which is a material having properties between aluminum and magnetic material; a material having a medium conductivity, such as a multilayer pan that is made of a thick plate (2 mm thick, for example) or a thin plate of a non-magnetic stainless steel, and a high conductivity material, e.g. aluminum and copper, bonded thereto; and a material having a high conductivity, such as an aluminum pan and a cupper pan. As shown in FIG. 2, the characteristics of the relation of the magnitude of the current through resonant capacitor 60 with respect to the magnitude of the input current of the induction heating device are different to identifiable degrees. Therefore, comparison between the magnitude of the input current and the magnitude of the output current allows accurate classification of these materials. Preferably, the induction heating device is controlled so that the switching elements are driven appropriately for the load material.

Figure 3:
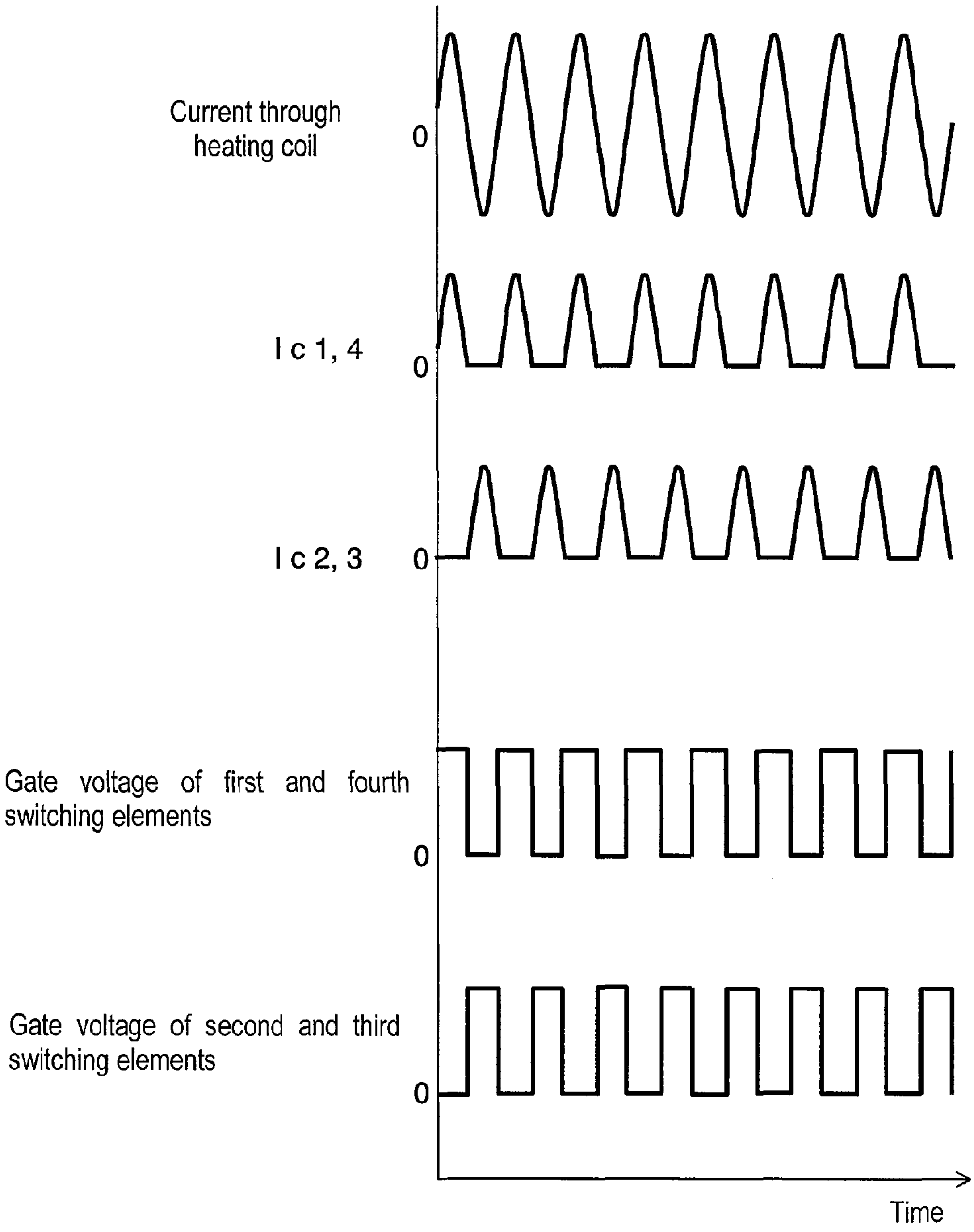
FIG. 3 is a chart showing waveforms in the respective parts of the circuit of the induction heating device in a low and low-medium conductivity material mode in accordance with the first exemplary embodiment of the present invention.
Figure 4:
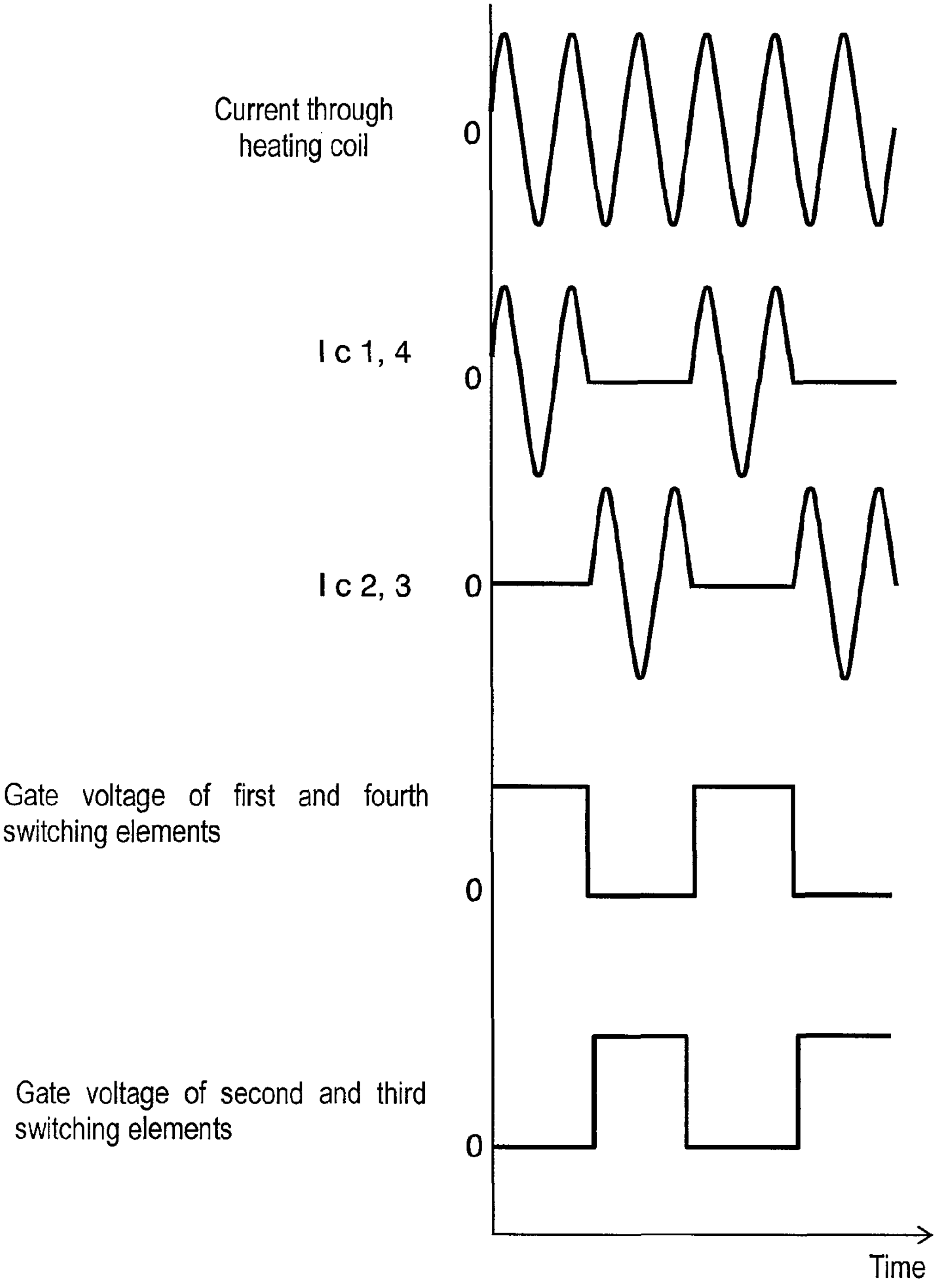
FIG. 4 is a chart showing waveforms in the respective parts of the circuit of the induction heating device in a high conductivity material mode in accordance with the first exemplary embodiment of the present invention.
Figure 5:
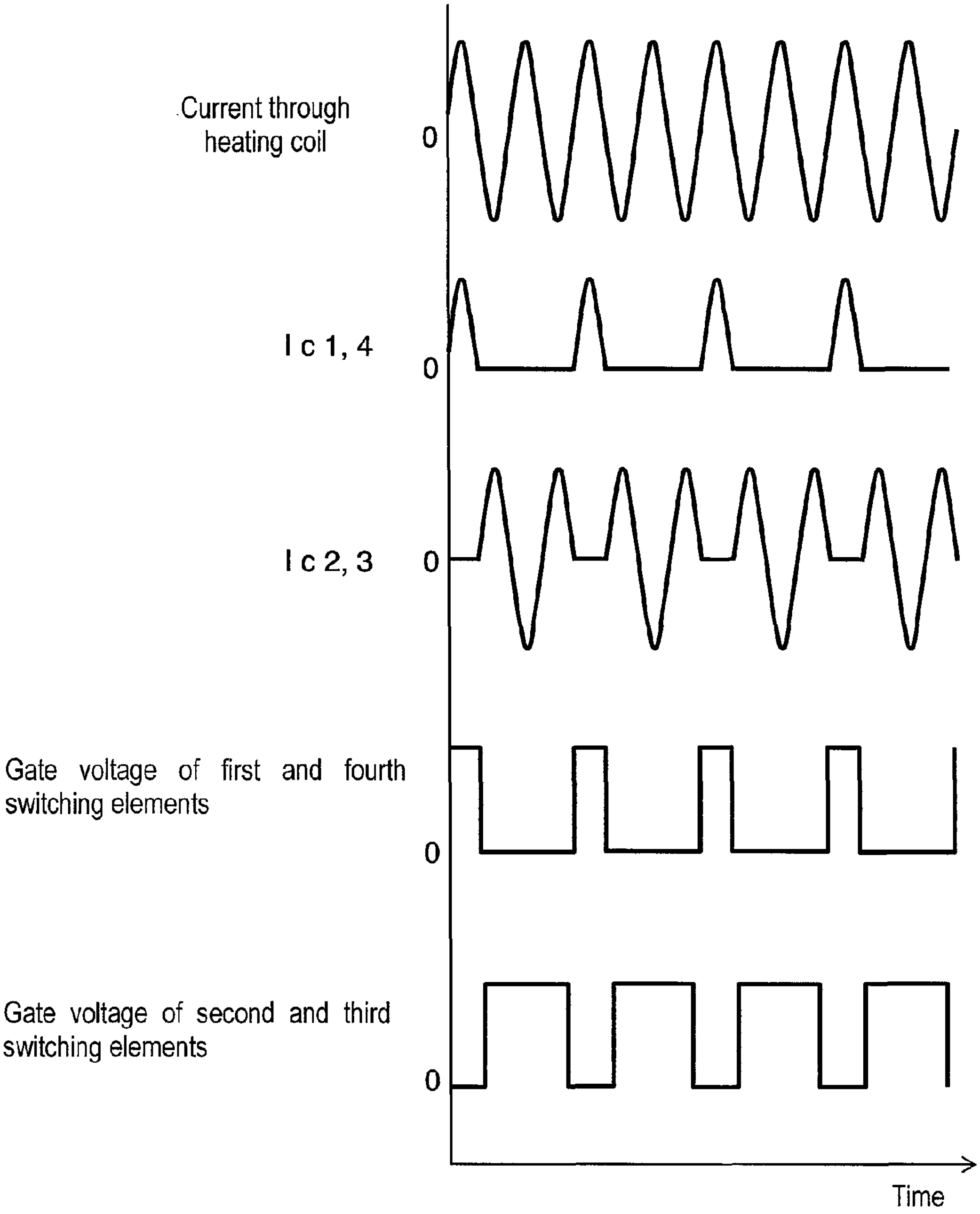
FIG. 5 is a chart showing waveforms in the respective parts of the circuit of the induction heating device in a medium conductivity material mode in accordance with the first exemplary embodiment of the present invention.
Figure 6:
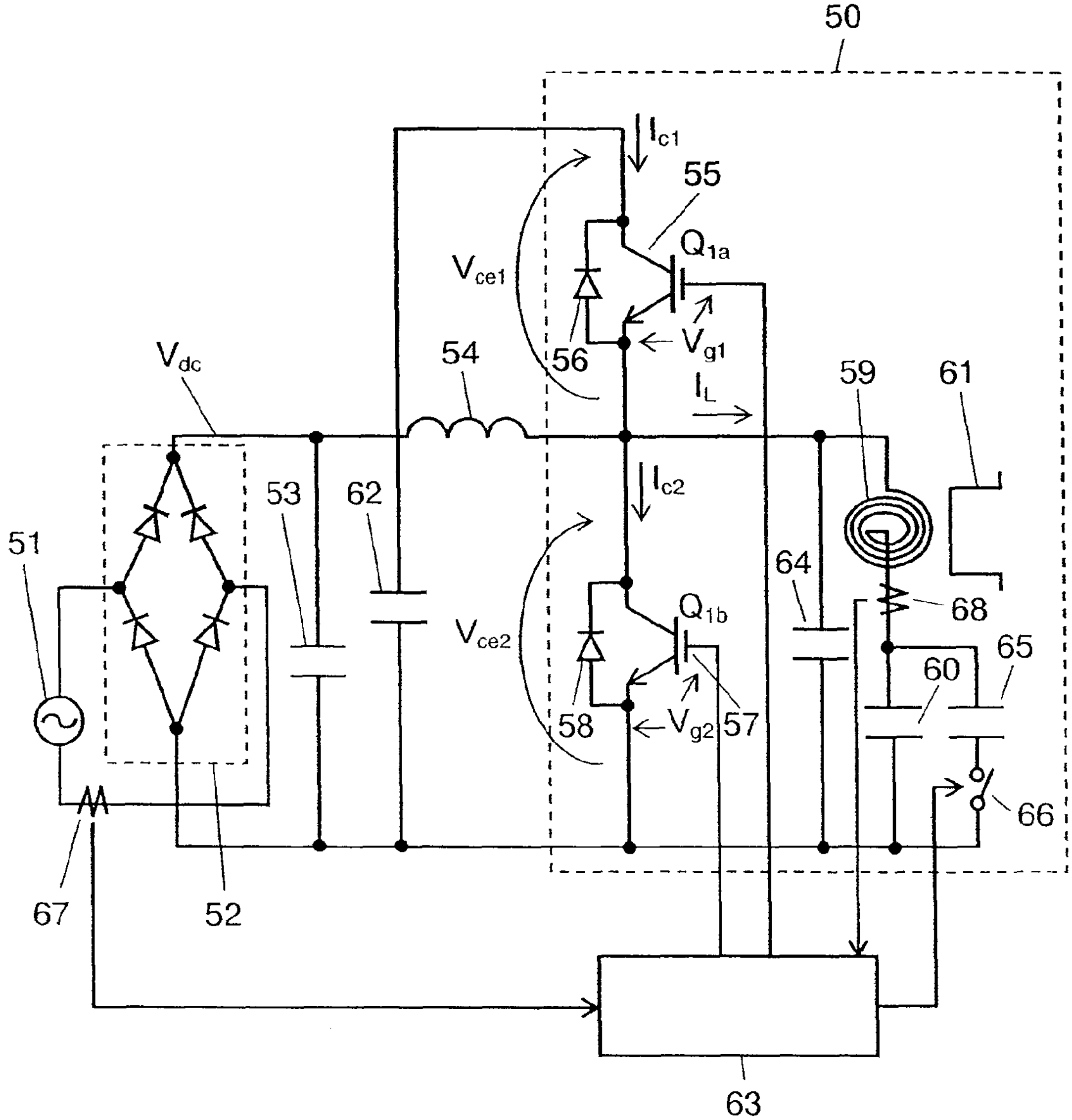
FIG. 6 PRIOR ART
FIG. 6 is a circuit structure diagram of a conventional induction heating device.
Figure 7A:
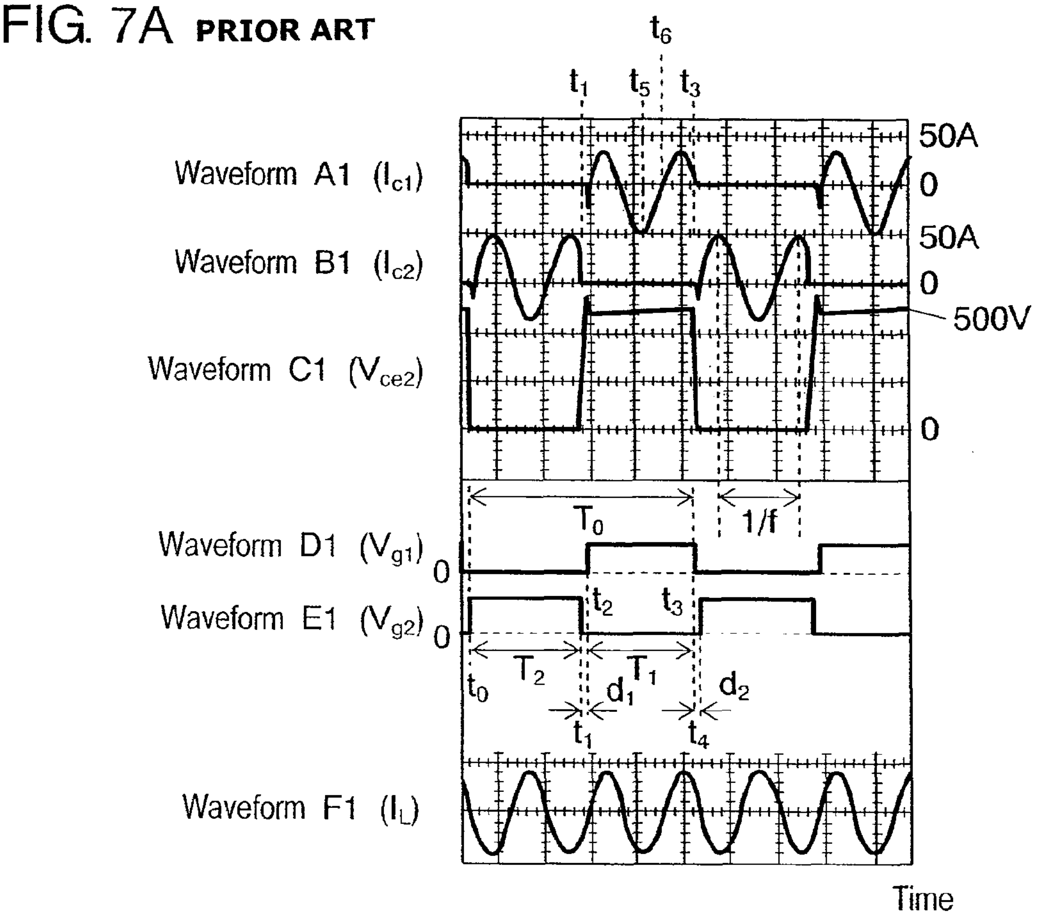
FIG. 7A PRIOR ART
FIG. 7A is a chart showing waveforms in the respective parts of the conventional induction heating device.
Figure 7B:
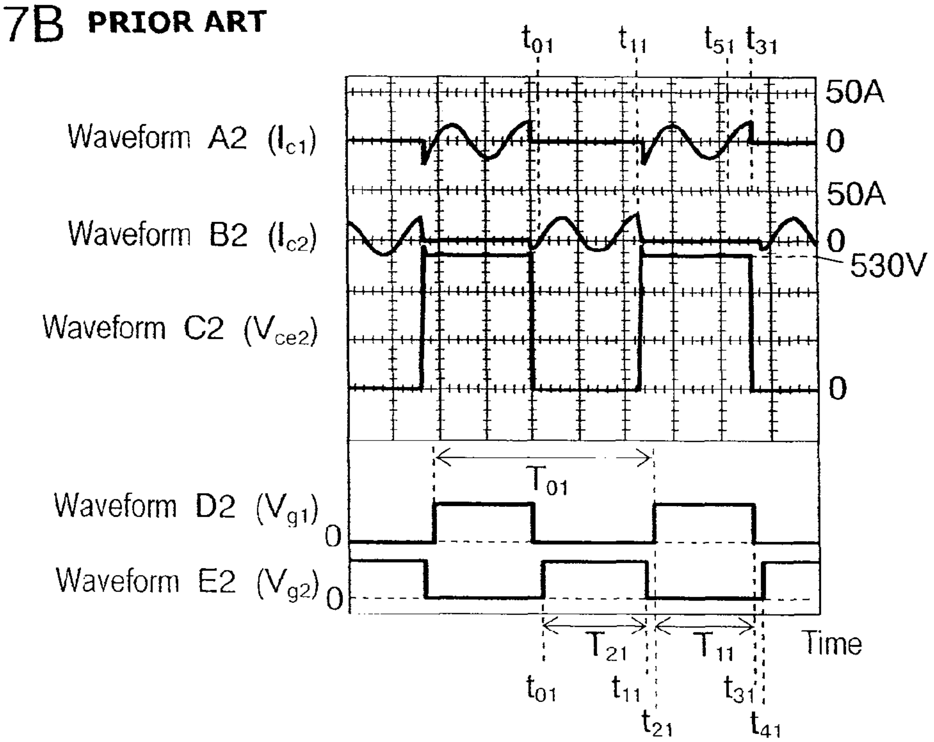
FIG. 7B PRIOR ART
FIG. 7B is a chart showing waveforms in the respective parts of the conventional induction heating device.

Next, a description is provided of the operation of the induction heating device of the first exemplary embodiment, with reference to FIGS. 3 through 5. FIGS. 3 through 5 are charts showing waveforms in the respective parts of the circuit of the induction heating device of the first exemplary embodiment.

First, with reference to FIG. 3, a description is provided of the operation of the induction heating device when the load is made of a magnetic material having a low conductivity, such as an iron pan. When load material detector 72 determines that the load is made of a material having a low conductivity during a gradual increase of output from a low output at a drive frequency of approximately 60 kHz after activation of inverter 70, heating output control circuit 63 increases the drive frequency to approximately 90 kHz, which is substantially equal to a frequency corresponding the resonance frequency, and starts heating at a low output again. In other words, the induction heating device operates in a low conductivity material mode. In this mode, the drive frequency of switching elements 74, 75, 76, and 77 approaches approximately 90 kHz, i.e. the resonance frequency of the resonance circuit, and the minimum output is obtained at a frequency higher than the resonance frequency. The induction heating device gradually increases the drive frequency from the set value so that the drive frequency approaches but does not exceed the resonance frequency, and increases output to a predetermined value.

At this time, the circuit of the induction heating device operates to have waveforms in the respective parts as shown in FIG. 3 at a point in proximity to the resonance point at which the maximum heating output is obtained. The top waveform in FIG. 3 is a waveform of the current flowing through heating coil 59. Ic1 and 4 show a waveform of the collector current of first switching element 74 and fourth switching element 77. Ic 2 and 3 show a waveform of the collector current of second switching element 75 and third switching element 76. The lower waveforms are a waveform of the gate voltage of first switching element 74 and fourth switching element 77 and a waveform of the gate voltage of second switching element 75 and third switching element 76. At this time, power factor improvement circuit 71 increases 200V of the commercial power supply to 450V, according to the output signal from load material detector 72, and stores electricity in second smoothing capacitor 73. In this case, because the equivalent resistance at resonance including the load is larger and Q (resonance sharpness) of the resonance circuit is smaller, the heating output is smaller than the heating output with a load material having a smaller equivalent resistance at resonance, such as aluminum. However, because the drive frequency of switching elements 74, 75, 76, and 77 is approximately 90 kHz, i.e. the resonance frequency of the resonance circuit, the maximum heating output at resonance is larger than the maximum heating output when the drive frequency is 1/n time (n being equal to or larger than two). Further, the input voltage of inverter 70 increased to a high voltage of 450V further increases the maximum heating output, thus providing sufficient heating output.

Next, again with reference to FIG. 3, a description is provided of the operation of the induction heating device when the load is made of a material having a low to medium conductivity, such as a non-magnetic stainless steel thin plate. The non-magnetic stainless steel has a low magnetic permeability. Thus, this material has a depth of penetration of high-frequency current larger than that of a magnetic material having a low conductivity, and has an equivalent conductivity with respect to induced current, i.e. a high-frequency current, smaller than that of the magnetic material. On the other hand, when a material is a non-magnetic stainless steel but has a low to medium conductivity, such as a thin plate having a thickness smaller than the depth of penetration, the distribution of induced current is physically restricted by the thickness of the plate. Thus, such a thin plate has an equivalent conductivity with respect to the induced current larger than that of a thicker plate. When load material detector 72 detects that the material has a low to medium conductivity, power factor improvement circuit 71 increases 200V of the commercial power supply to 330V and stores electricity in second smoothing capacitor 73. Then, heating output control circuit 63 operates in a low-medium conductivity mode. In other words, heating output control circuit 63 sets the drive frequency of the switching elements at approximately 90 kHz, which is substantially equal to a frequency corresponding to the resonance frequency of the resonance circuit. The circuit of the induction heating device operates to have waveforms in the respective parts similar to those in the low conductivity material mode, as shown in FIG. 3. In this manner, in the low-medium conductivity material mode, the input voltage of inverter 70 to be applied to switching elements 74, 75, 76, and 77 is set at 330V, which is lower than 450V in the low conductivity material mode. This setting reduces the switching loss. Even though the input voltage of inverter 70 is set lower than the input voltage in the low conductivity material mode, the high-frequency resistance of the load is larger and Q of the resonance circuit including the load is smaller than those in the low conductivity material mode. Thus, sufficient heating output can be obtained. In other words, the input voltage of inverter 70 is set lower than the input voltage in the low conductivity material mode so that the maximum heating output approaches the required heating output. This setting prevents increases in the load of voltage and current to be imposed on switching elements 74, 75, 76, and 77 while ensuring the required heating output. In other words, according to the load material detection result of load material detector 72, the output voltage of power factor improvement circuit 71 is changed so that the maximum heating output approaches the set value of the heating output when the load has a higher conductivity. Thus, thermal efficiency can be improved by reducing the loss of switching elements 74, 75, 76, and 77, or the current through inverter 70, with a simplified structure.

Next, with reference to FIG. 4, a description is provided of the operation of the induction heating device when the load is made of a non-magnetic material having a high conductivity (hereinafter referred to as a high conductivity material), such as an aluminum pan and copper pan. In this case, the circuit of the induction heating device operates to have waveforms in the respective parts as shown in FIG. 4. The abscissa axis and the ordinate axis are similar to those of FIG. 3 and the detailed description thereof is omitted.

When load material detector 72 detects that the load is made of a material having a high conductivity at activation, after a predetermined drive-time ratio is reached, first, first switching element 74 and fourth switching element 77 are changed to have a drive period in a high conductivity material mode in which the resonance current has a shorter cycle, as shown by Ic1 and 4. Next, as shown by Ic 2 and 3, second switching element 75 and third switching element 76 are changed to have a drive period in the high conductivity material mode in which the resonance current has a shorter cycle. At this mode change, the drive period is set so that a low output is obtained. At this time, switching elements 74 and 77 may change the mode first, or switching elements 75 and 76 may change the mode first.

In the high conductivity material mode, the loss of each of switching elements 74, 75, 76, and 77 is reduced by setting the drive frequency of the switching elements at approximately 30 kHz, which is approximately a third of the resonance frequency of the resonance circuit. Power factor improvement circuit 71 operates to increase 200V of the commercial power supply to 400V, which is higher than the voltage in the low-medium conductivity material mode and lower than the low conductivity material mode, and outputs the voltage to inverter 70. Thus, the power factor improvement circuit operates to improve the power factor of the commercial power supply while increasing the maximum heating output obtained at a drive frequency of the switching elements in proximity to a third of the resonance frequency. In this manner, the induction heating device reduces the loss of switching elements 74, 75, 76, and 77 by setting the drive frequency lower than the resonance frequency. Further, the induction heating device ensures required heating output at the drive frequency by increasing the input voltage of inverter 70 so that the maximum heating output approaches the set output, i.e. the required heating output, or the maximum heating output is equal to or higher than the set output. Thus, the induction heating device operates in the high conductivity material mode in which a metal having a low magnetic permeability and a high conductivity, such as aluminum, can be heated.

Next, with reference to FIG. 5, a description is provided of the operation of the induction heating device when the load is made of a material having a medium conductivity, such as a multilayer pan. When load material detector 72 detects that the load is made of a material having properties between a high conductivity material and a low-medium conductivity material, heating output control circuit 63 drives switching elements 74, 75, 76, and 77 using the waveforms of the collector current and gate current as shown in FIG. 5. Such materials include a composite material that is made of a thick or thin plate of a non-magnetic stainless steel, and a high conductivity material, e.g. aluminum and copper, bonded thereto, such as a multilayer pan. Similar to FIG. 3, Ic1 and 4 show a waveform of the collector current of first switching element 74 and fourth switching element 77. Ic2 and 3 show a waveform of the collector current of second switching element 75 and third switching element 76.

The drive frequency of the switching elements is set at approximately 45 kHz, which is approximately a half of the resonance frequency of the resonance circuit. Specifically, as shown by Ic1 and 4, after first switching element 74 and fourth switching element 77 are driven, resonance current having a half cycle is supplied to stop the driving of first switching element 74 and fourth switching element 77. Next, as shown by Ic2 and 3, after the driving of second switching element 75 and third switching element 76 is started, resonance current having one and a half cycle is supplied to stop the driving of second switching element 75 and third switching element 76. These operations are repeated. Such a driving method is performed in the medium conductivity material mode. At this time, power factor improvement circuit 71 operates to increase 200V of the commercial power supply to 330V, which is equal to the voltage in the low-medium conductivity mode, and store electricity in second smoothing capacitor 73 for smoothing. In comparison with the low-medium conductivity mode, the drive frequency is changed from a frequency substantially equal to the resonance frequency to a frequency approximately ½ time thereof in the medium conductivity mode. Thus, the loss of the switching elements can be reduced. For the heating output, a decrease in the maximum heating output caused by the above change in the drive frequency is cancelled by an increase in the maximum heating output caused by the smaller equivalent resistance at resonance. As a result, the input voltage of inverter 70 is the same and the required heating output can be obtained. In the medium conductivity mode, the equivalent resistance at resonance of the resonance circuit is larger and the input voltage of inverter 70 is smaller than those in the high conductivity material mode. Thus, the maximum heating output is reduced. However, the drive frequency is set at approximately 45 kHz, i.e. approximately a half of the resonance frequency, which is higher than the drive frequency (approximately a third of the resonance frequency) in the high conductivity material mode. This setting can provide the sufficiently large maximum heating output at a frequency in proximity to the drive frequency. Such an operation allows the induction heating device to have the following features in the medium conductivity mode. The loss of the switching elements is reduced by setting the drive frequency lower than those in the low conductivity mode and the low-medium conductivity mode. Sufficient heating output is ensured by setting the drive frequency higher than the drive frequency in the high conductivity material mode. Power factor improvement circuit 71 makes the voltage to be applied to the switching elements lower than the voltage in the high conductivity material mode to reduce the switching loss.

In the above description, power factor improvement circuit 71 increases the voltage to a predetermined value in each of the low conductivity mode, low-medium conductivity mode, medium conductivity mode, and high conductivity mode. However, the present invention is not limited to this structure. The output voltage of power factor improvement circuit 71 may be changed according to the required heating output, or preset heating output (including heating output to be set by the user, and heating output that is stored in heating output control circuit 63 and set at temperature control or automatic cooking when the function of adjusting the temperature or preventing the excessive temperature rise of the load is exerted.) In the medium conductivity mode, and the high conductivity mode, the loss of the switching elements can be reduced by setting the drive frequency lower then the resonance frequency. However, the maximum heating output at a frequency in proximity to the drive frequency is smaller than that at a frequency in proximity to the resonance frequency. For this reason, adjustment made so that the maximum heating output is larger than the required or set heating output can provide desired heating output without increasing the input voltage of inverter 70 unnecessarily. Thus, increases in the loss of the components of the inverter, such as switching elements, can be inhibited with a simplified structure.

FIGS. 3 through 5 show waveforms at a frequency in proximity to the resonance point at which the maximum heating output is provided, as a n example in which switching elements 74, 75, 76, and 77 are turned off at a point when current flowing through the switching elements is zero. However, the timing of turning off the switching elements is not limited to this example. In order to prevent short-circuit current from flowing through the switching elements, the following operation may be performed. The switching elements are turned off when current flows through the switching elements in the forward direction, and driven at a frequency higher than the resonance frequency in proximity to the resonance frequency so that heating output lower than the maximum heating output is provided. In this case, back current, i.e. diode current, not shown in FIGS. 3 through 5 flows through switching elements 74, 75, 76, and 77.

Each of switching elements 74, 75, 76, and 77 of FIG. 1 is made of an IGBT and a diode connected in anti-parallel with the IGBT. The IGBT and the diode may be incorporated into one package or separate packages. A MOS-FET (field-effect transistor) may be used in place of the IGBT.

As described in the first exemplary embodiment of the present invention, when the drive frequency of the switching elements is set equal to the resonance frequency for a load made of a magnetic material, the drive frequency is 1/n time of the resonance frequency for a non-magnetic material having a high conductivity. Because the drive frequency needs to be set at a value exceeding the audio-frequency range, the resonance frequency needs to be set at n×20 kHz or higher. For this reason, when the load is detected to be made of a magnetic material, the drive frequency of the switching elements needs to be set at n×20 kHz or higher. For this reason, in the first exemplary embodiment, the resonance frequency is set at approximately 30 kHz, and the drive frequency of the switching elements for a magnetic material is set at approximately 90 kHz (n=3). In this manner, the present invention can efficiently suppress the magnitude of the current flowing through the switching elements according to the load, but has characteristics of having a high drive frequency in the case of a magnetic material. To address this problem, the characteristics of a MOS-FET, i.e. a larger loss at turn-on but faster switching speed than the IGBT, can effectively be utilized in the structure of the present invention. Thus, even when the drive frequency of the switching elements is set at approximately 90 kHz, the loss of the switching elements can be inhibited to a practical level.

In the structure of FIG. 1, heating output control circuit 63 is separated from load material detector 72. However, these parts may be formed into the same microcomputer so that the component and function can be shared. For example, heating output control circuit 63 may have the function of load material detector 72, and heating control circuit 63 may control the boosting operation of power factor improvement circuit 71.

As described above, the induction heating device of the first exemplary embodiment includes the following elements: the resonance circuit that includes heating coil 59 magnetically coupling a load and having substantially a fixed number of turns, and resonant capacitor 60 having substantially a fixed capacitance; power factor improvement circuit 71, i.e. a power factor improvement part, which increases, 200V of the commercial power supply, supplies the increased voltage to inverter 70 for supplying power to the resonance circuit, and improves the commercial alternating current; and load material detector 72 that detects the material of the load. Inverter 70 has a full-bridge circuit. Heating output control circuit 63, i.e. a heating output controller, switches the drive frequency of switching elements 74, 75, 76, and 77 between a frequency substantially equal to the resonance frequency of the resonance circuit and a frequency substantially 1/n time (n being an integer equal to or larger than two) thereof, according to a load material detection result of load material detector 72. Power factor improvement circuit 71 is structured to be capable of changing the output voltage. The resonance frequency of the resonance circuit is fixed so that the drive frequency of the switching elements is higher than an audio frequency (approximately 20 kHz or lower), when n is at the maximum. With this structure, using power factor improvement circuit 71 for causing the power factor of the commercial power supply to approach one and the full-bridge circuit, the relation between the drive frequency and the resonance frequency and the input voltage of inverter 70 are switched at the same time, according to the load materials ranging from a high conductivity material to a low conductivity material. Thus, the heating modes can be switched. As a result, with a simplified structure of the resonance circuit, the loss of the switching elements can be reduced and the heating output can be increased irrespective of the load materials.

The induction heating device of the first exemplary embodiment sets the drive frequency of switching elements 74, 75, 76, and 77 substantially equal to the resonance frequency of the resonance circuit, when load material detector 72 detects that the load is made of a magnetic material. When the load material detector detects that the load is made of a non-magnetic material having a high conductivity, the induction heating device sets the drive frequency of switching elements 74, 75, 76, and 77 substantially 1/n time (n being an integer equal to or larger than two) of the resonance frequency of the resonance circuit, and sets the output voltage of power factor improvement circuit 71 lower than the output voltage for the above magnetic material. With such a simplified structure, for a non-magnetic material having a high conductivity, such as aluminum and copper, the current through heating coil 59 is set at a frequency higher than the drive frequency of the switching elements. For a magnetic material having a low conductivity, such as iron and a magnetic stainless steel, the frequency of the current through heating coil 59 is set equal to the drive frequency of the switching elements so that the resonance energy of the resonance circuit is increased. These settings can provide larger heating output while inhibiting the loss of the switching elements, irrespective of the load materials.

Further, according to a load material detection result of load material detector 72, the induction heating device of the first exemplary embodiment sets n=3, when the load material is detected as a non-magnetic material having a high conductivity equivalent to that of aluminum. When the load material is detected as a non-magnetic material having a conductivity lower than that of aluminum, the induction heating device sets n=2. With such a structure, for a non-magnetic material having a high conductivity, such as aluminum and copper, the current through heating coil 59 is set at a frequency approximately three times the drive frequency of the switching elements. For a non-magnetic material having a conductivity lower than that of aluminum, such as a non-magnetic stainless steel, the current through heating coil 59 is set at a frequency approximately twice the drive frequency of the switching elements. Even in similar non-magnetic load materials, for a material having a lower conductivity, the value of n is reduced so that the material has larger resonance energy than a material having a higher conductivity and provides the larger maximum heating output. Thus, when the load is made of a non-magnetic material, larger heating output can be obtained while the loss of the switching elements is inhibited.

Further, when the load material is detected as a non-magnetic material having a conductivity lower than that of aluminum and equal to or higher than a predetermined conductivity, the induction heating device of the first exemplary embodiments sets n=2. When the load material is detected as a non-magnetic material having a conductivity lower than the predetermined conductivity, the induction heating device sets n=1. With this structure, when the load material is detected as a non-magnetic material having a conductivity lower than that of aluminum and equal to or higher than a predetermined conductivity and a relatively large thickness (of approximately 2 mm, for example), such as a non-magnetic stainless steel, the current through heating coil 59 is set at a frequency approximately twice the drive frequency of the switching elements. When the load material is detected as a non-magnetic material having a conductivity lower than that of aluminum and the predetermined conductivity, the current through heating coil 59 is set at a frequency equal to the drive frequency of the switching elements, i.e. n=1, so that the resonance energy is larger than the resonance energy of a material having a conductivity equal to or higher than the predetermined conductivity and the maximum heating output is increased. Thus, when the load is made of a non-magnetic material having a conductivity lower than that of aluminum, the heating mode can be switched according to the thickness of the load to provide larger heating output while inhibiting the loss of the switching elements.

In the induction heating device of the first exemplary embodiment, the output voltage of power factor improvement circuit 71 is changed according to a set value of the heating output so that the maximum heating output approaches the set value of the heating output. This structure can prevent the following problem. Excessively low resonance voltage of the resonance circuit causes a short circuit mode to the switching elements, or inversely, excessively high resonance voltage of the resonance circuit causes damage to the switching elements or increases the loss thereof.

In the induction heating device of the first exemplary embodiment, the output voltage of power factor improvement circuit 71 is changed according to a set value of the heating output so that the maximum heating output is equal to or higher than the set value of the heating output, when n is equal to or larger than two. This structure prevents the following problem. When n is equal to or larger than two, the maximum heating output is smaller than the maximum heating output when n=1. Thus, when the heating controller sets heating output higher than the maximum heating output and the induction heating device attempts to achieve the set value, the stable operating point does not exists. For this reason, the targeted heating output cannot be obtained and a short circuit mode in which an excessive load is imposed on the switching elements may result. However, power factor improvement circuit 71 increases the voltage so that the maximum heating output is equal to or larger than the set value, and thus the targeted heating output can be obtained without causing damage or an increase in the loss.

In the induction heating device of the first exemplary embodiment, when load material detector 72 detects that the load has a higher conductivity, the output voltage of power factor improvement circuit 71 is changed so that the maximum heating output approaches a set value of the heating output. This structure increases the maximum heating output determined by the resonance voltage of the resonance circuit to provide sufficient heating output. On the other hand, this structure can prevent the following problem. Excessively high resonance voltage of the resonance circuit increases the load imposed on the switching elements, thus causing damage thereto or increasing the loss thereof.

In the induction heating device of the first exemplary embodiment, the output voltage of power factor improvement circuit 71 is changed according to a set value of the heating output so that the maximum heating output is equal to or higher than the set value of the heating output, when n is equal to or larger than two. This structure increases the maximum heating output determined by the resonance voltage of the resonance circuit so that the induction heating device can heat the load at the set value of the heating output. Further, this structure can prevent the following problem. Excessively high resonance voltage of the resonance circuit increases the load imposed on the switching elements, thus causing damage thereto or increasing the loss thereof.

In the induction heating device of the first exemplary embodiment, the boosting function of power factor improvement circuit 71 is stopped according to a load material detection result of load material detector 72. With this structure, when the boosting function of power factor improvement circuit 71 is stopped, the voltage of the commercial power supply can be supplied to inverter 70. This structure can suppress the voltage or current applied to the switching elements at a small heating output or the like. Thus, an induction heating device that achieves higher thermal efficiency with a simplified structure can be provided.

In the induction heating device of the first exemplary embodiment, upon reception of at least detection output from current transformer 67 working as a heating output detector for giving output according to heating output, and detection output from current transformer 68 working as a resonance current detector for detecting the voltage or current of resonant capacitor 60 or heating coil 59, load material detector 72 compares the heating output and the magnitude of the resonance energy of the resonance circuit. When the ratio of the output of the resonance current detector with respect to the output of the heating output detector is large, the load material detector determines that the resonance circuit has a small equivalent resistance at resonance, and outputs the detection result according to the magnitude of the equivalent resistance at resonance. This structure allows determination of the magnitude of the maximum heating output when the drive frequency of the switching elements is set at 1/n time (n being an integer equal to or larger than two) of the resonance frequency. In other words, the maximum heating output is inversely proportional to the magnitude of the equivalent resistance at resonance of the resonance circuit, and proportional to resonance sharpness (Q) of the resonance circuit. Thus, with such a simplified structure, the magnitude of the maximum heating output of the resonance circuit can accurately be determined according to the load materials ranging from a material having a high conductivity, such as aluminum and copper, to a magnetic material having a low conductivity.

In the induction heating device of the first exemplary embodiment, when the resonance circuit has a larger equivalent resistance at resonance, the output voltage of power factor improvement circuit 71 is increased to increase the maximum heating output as required, for a load material having the same n value but a lower conductivity. Thus, the heating efficiency can be improved.

In the induction heating device of the first exemplary embodiment, when the resonance circuit has a larger equivalent resistance at resonance and the output voltage of power factor improvement circuit 71 is the same, the value of n is decreased to increase the maximum heating output as required, for a load material having a lower conductivity. Thus, the required heating output can be obtained.

In the induction heating device of the first exemplary embodiment, when the resonance circuit has a larger equivalent resistance at resonance, the value of n is decreased and the output voltage of power factor improvement circuit 71 is increased to increase the maximum heating output as required, for a load material having a lower conductivity. Thus, the heating efficiency can be improved.

In the induction heating device of the first exemplary embodiment, resonance current having a half cycle or shorter is supplied in the drive period of first switching element 74 and fourth switching element 77, and resonance current having one and a half cycle or longer is supplied in the drive period of second switching element 75 and third switching element 76. However, the similar advantage can be offered by supplying resonance current having a half cycle or shorter in the drive period of second switching element 75 and third switching element 76, and supplying resonance current having one and a half cycle or longer in the drive period of first switching element 74 and fourth switching element 77.

Further, in the induction heating device of the first exemplary embodiment, in place of the operation of load material detector 72, detection of the voltage of resonant capacitor 60 allows detection of an increase in the current through switching elements 74, 75, 76, and 77. In this case, the load material can be detected and the heating mode can be switched with a more simplified structure. In other words, the heating output detector is structured to estimate input current by detecting input current or input power, or detecting at least one of voltage and current of the resonance circuit made of heating coil 59 and resonant capacitor 60. This simplified structure can provide an induction heating device capable of providing larger heating output irrespective of the load materials ranging from a material having a high conductivity, such as aluminum and cupper, to a magnetic material having a low conductivity.

In the induction heating device of the first exemplary embodiment, the magnitude of the current through switching elements 74, 75, 76, and 77 of inverter 70 can be controlled to a value appropriate for the load and heating output. However, the induction heating device has characteristics of having a high drive frequency in the case of a magnetic material. To address this problem, a MOS-FET having characteristics of having a larger voltage thus a larger loss at turn-on but a faster switching speed than the IGBT can be used and the characteristics thereof can effectively be utilized. For example, when the drive frequency of the switching elements is set substantially equal to the resonance frequency and the switching elements are driven at a drive frequency ranging from approximately 60 kHz to 90 kHz for a magnetic material, the loss of the switching elements can be inhibited to a practical level.

INDUSTRIAL APPLICABILITY

As described above, the induction heating device of the present invention can increase the heating output irrespective of the load materials, and thus is useful in applications, such as industrial induction heating.

The invention claimed is:

1. An induction heating device comprising:

a resonance circuit having a resonance frequency comprising:

a heating coil magnetically coupling a load and having a fixed number of turns; and a resonant capacitor having a fixed capacitance;

an inverter that includes switching elements forming a full-bridge circuit, and supplies electric power to the resonance circuit;

a heating output controller for driving the switching elements and controlling heating output of the heating coil;

a rectifier for rectifying a commercial alternating current;

a power factor improvement part for boosting rectified output from the rectifier, supplying an output voltage to the inverter, and improving a power factor of the commercial alternating current; and a load material detector for detecting a level of conductivity and a level of magnetic permeability of a material of the load, wherein the heating output controller switches a drive frequency of the switching elements between a first frequency corresponding to a frequency equal to the resonance frequency of the resonance circuit and a second frequency corresponding to 1/n times the resonance frequency of the resonance circuit (n being an integer greater than or equal to two) according to the level of conductivity and the level of magnetic permeability of the load material detector, and the power factor improvement part changes a magnitude of the output voltage supplied to the inverter according to the level of conductivity and the level of magnetic permeability determined by the load material detector.

2. The induction heating device of claim 1, wherein according to the load material detection result of the load material detector,
when the load material detector detects that the load is made of a magnetic material, the drive frequency of the switching elements is set equal to the resonance frequency of the resonance circuit, and
when the load material detector detects that the load is made of a non-magnetic material having a high conductivity, the drive frequency of the switching elements is set to the 1/n times the resonance frequency of the resonance circuit, and the output voltage of the power factor improvement circuit is set lower than the output voltage for the above magnetic material.

3. The induction heating device of claim 2, wherein according to the load material detection result of the load material detector,
when the load material detector detects that the load is made of a non-magnetic material having a high conductivity equivalent to a conductivity of aluminum, n=3, and
when the load material detector detects that the load is made of a non-magnetic material having a conductivity lower than the conductivity of aluminum, n=2.

4. The induction heating device of claim 2, wherein
when the load material detector detects that the load is made of a non-magnetic material having a conductivity lower than a conductivity of aluminum and equal to or higher than a predetermined conductivity, n=2, and
when the load material detector detects that the load is made of a non-magnetic material having a conductivity lower than the predetermined conductivity, n=1.

5. The induction heating device of claim 1, wherein
the output voltage of the power factor improvement part is changed according to a set value of the heating output so that a maximum heating output approaches the set value of the heating output.

6. The induction heating device of claim 1, wherein
the output voltage of the power factor improvement part is changed according to a set value of the heating output so that a maximum heating output is equal to or higher than the set value of the heating output, when n is equal to or larger than two.

7. The induction heating device of claim 1, wherein according to the load material detection result of the load material detector,
when the load material detector detects that the load has a higher conductivity, the output voltage of the power factor improvement part is changed so that a maximum heating output approaches a set value of the heating output.

8. The induction heating device of claim 1, wherein
the output voltage of the power factor improvement part is changed according to the load material detection result of the load material detector so that a maximum heating output is equal to or higher than a set value of the heating output, when n is equal to or larger than two.

9. The induction heating device of claim 1, wherein
a boosting function of the power factor improvement part is stopped according to the load material detection result of the load material detector.

10. The induction heating device of claim 1, wherein
the load material detector compares at least a detection output from a heating output detector for giving output according to the heating output and a detection output from a resonance current detector for detecting one of voltage and current of one of the resonant capacitor and the heating coil, and
when a ratio of the output of the resonance current detector with respect to the output of the heating output detector is large, the load material detector determines that the resonance circuit has a small equivalent resistance at resonance, and outputs a detection result according to a magnitude of the equivalent resistance at resonance.

11. The induction heating device of claim 10, wherein
when the resonance circuit has a larger equivalent resistance at resonance, the output voltage of the power factor improvement part is increased.

12. The induction heating device of claim 11, wherein
when the resonance circuit has a larger equivalent resistance at resonance, a value of n is decreased and the output voltage of the power factor improvement part is increased.

13. The induction heating device of claim 10, wherein
when the resonance circuit has a larger equivalent resistance at resonance, a value of n is decreased.

14. The induction heating device of claim 10, wherein
the heating output detector estimates input current by detecting one of the input current and input power, or detecting at least one of voltage and current of the resonance circuit.

15. The induction heating device of claim 1, wherein each of the switching elements is made at least of a MOS-FET.

16. An induction heating device comprising:
a resonance circuit having a resonance frequency comprising:
a heating coil magnetically coupling a load and having a fixed number of turns; and
a resonant capacitor having a fixed capacitance;
an inverter that includes switching elements forming a full-bridge circuit, and supplies electric power to the resonance circuit;
a heating output controller for driving the switching elements and controlling heating output of the heating coil so that a maximum heating output approaches a set output;
a rectifier for rectifying a commercial alternating current;
a power factor improvement part for boosting rectified output from the rectifier, supplying an output voltage to the inverter, and improving a power factor of the commercial alternating current; and
a load material detector for detecting levels including a level of conductivity and a level of magnetic permeability of a material of the load,
wherein the heating output controller controls a drive frequency of the switching elements according to the levels detected by the load material detector,
the heating output controller sets the drive frequency of the switching elements equal to the resonance frequency of the resonance circuit when the load material detector detects that the load is made of a magnetic material,
the heating output controller sets the drive frequency of the switching elements to 1/n times the resonance frequency of the resonance circuit (n being an integer greater than or equal to two) when the load material detector detects that the load is made of a non-magnetic material having a high conductivity, and
the heating output controller changes the output voltage of the power factor improvement part according to a set value of the heating output so that the maximum heating output is equal to or higher than the set value of the heating output, when the load material detector detects that the load is made of the non-magnetic material having the high conductivity.

* * * * *